United States Patent
Hosoi et al.

[11] Patent Number: 5,848,806
[45] Date of Patent: Dec. 15, 1998

[54] STEERING WHEEL

[75] Inventors: Akio Hosoi, Komaki; Atsushi Nagata, Inazawa; Katsunobu Sakane, Ichinomiya, all of Japan

[73] Assignee: Toyoda Gosei Co., Ltd., Aichi-ken, Japan

[21] Appl. No.: 885,197

[22] Filed: Jun. 30, 1997

[30] Foreign Application Priority Data

Jul. 1, 1996 [JP] Japan .................................. 8-171037

[51] Int. Cl.$^6$ ........................................................ B62D 1/16
[52] U.S. Cl. .............................................. 280/779; 74/552
[58] Field of Search .................................. 280/779, 728.2; 74/491, 499, 552

[56] References Cited

U.S. PATENT DOCUMENTS

| | | | |
|---|---|---|---|
| 5,144,861 | 9/1992 | Nishiyima et al. | 74/552 |
| 5,536,106 | 7/1996 | Landis et al. | 74/552 X |
| 5,749,598 | 5/1998 | Exer et al. | 282/728.2 |
| 5,778,734 | 7/1998 | Uchida | 44/552 |

FOREIGN PATENT DOCUMENTS 2-133955  11/1990  Japan .

*Primary Examiner*—Christopher P. Ellis
*Attorney, Agent, or Firm*—Cushman Darby & Cushman, IP Group of Pillsbury Madison & Sutro LLP

[57] ABSTRACT

A steering wheel includes a metal ring mounted on a steering shaft with a boss plate and at least one spoke. An adaptor is provided in the boss plate for securing the boss plate to the steering shaft. The adaptor includes a cylindrical portion into which the steering shaft is inserted and a yoke formed integrally with the cylindrical portion for holding the steering shaft. The yoke has flexible ends constituting a pair of clamping pieces. One of the clamping pieces is provided with a bolt hole while the other is provided with a through hole. A bolt is inserted through the through hole and then screwed into the bolt hole for holding the steering shaft with the yoke. A lower cover, which is made from a synthetic resin, surrounds the steering shaft and covers a lower part of the steering wheel. A holder is provided in the lower cover for supporting the bolt in a ready position to prevent the bolt from falling off the yoke. The bolt is accessible from the side of the steering wheel.

13 Claims, 11 Drawing Sheets

STEERING WHEEL

BACKGROUND OF THE INVENTION

1. Field of the Invention

The present invention relates to steering wheels for vehicles.

2. Description of the Related Art

A typical steering wheel includes an annular gripping ring and a pad. The pad is located at the center of the ring and is connected to the ring by spokes. A metal ring core is embedded in the ring while a metal spoke core is embedded in each spoke. The ring core and the spoke cores are covered with a surface layer made of polyurethane foam or the like. The spoke cores are coupled to a boss plate located below the pad. The boss plate is provided with a hole, which includes splines. The splines are formed on the inner circumferential surface of the hole. A steering shaft includes splines that correspond to the splines of the boss plate. The splines are formed at an outer circumferential surface of an end of the steering shaft. The end of the steering shaft is fitted in the hole of the boss plate by meshing the splines. Then, a nut is fastened to the end of the steering shaft to secure the steering wheel to the steering shaft. Subsequently, an air bag device or the like is installed in a space defined between the boss plate and the spokes. The air bag device is then covered by the pad.

Japanese Unexamined Utility Model Publication No. 2-133955 describes a steering wheel having a surface layer and a pad that are formed integrally. This structure eliminates slight gaps between the layer and the pad and thus improves the appearance of the steering wheel.

However, the steering wheel having the integrally formed surface layer and pad includes a closed outer surface. Thus, the nut may not be fastened to the steering shaft in a conventional way from the end of the steering shaft. Therefore, it is extremely difficult to mount the steering wheel on the steering shaft.

In contrast, there is a technique that employs a yoke-type boss plate. This structure allows inserting a bolt from a side of the steering wheel. Specifically, the yoke-type boss plate includes a cylindrical portion and a yoke that are formed integrally. Splines are formed on the inner surface of the cylindrical portion. The yoke is arched and provided with a pair of clamping pieces that are arranged at each end of the yoke. One of the clamping pieces is provided with a bolt hole, while the other is provided with a through hole. The steering shaft includes an engaging groove, which is arranged at a position that corresponds to the bolt hole and the through hole.

With an end of the steering shaft inserted through the cylindrical portion, the bolt is inserted from a side of the steering wheel into the through hole of the yoke. The bolt is then screwed in the bolt hole to fasten the yoke. This meshes the splines of the yoke and the splines of the cylindrical portion. Then, the bolt is engaged by the engaging portion provided on the steering shaft. The meshing of the splines prevents relative rotation of the steering wheel with respect to the steering shaft. The engagement between the bolt and the engaging groove prevents movement of the steering wheel in the axial direction of the steering shaft. Thus, the steering wheel is secured to the steering shaft.

As described above, the steering wheel employing the yoke-type boss plate allows inserting the bolt from the side of the steering wheel. Therefore, even with the pad and the surface layer formed integrally, the steering wheel is mounted on the steering shaft rather easily.

However, space for mounting the steering wheel on the steering shaft in a vehicle is limited. Furthermore, space for fastening the yoke with the bolt is limited to a marginal space defined by the boss plate and the spokes. This causes difficulty in mounting the steering wheel to the steering shaft in the vehicle. Therefore, it is preferable to loosely screw the bolt in the bolt hole of the yoke before mounting the steering wheel on the steering shaft. Thus, the bolt need not be positioned with respect to the bolt hole in the limited space allowed for assembly in the vehicle. Then, the bolt is simply fastened by a prescribed tool or jig to secure the steering wheel to the steering shaft. This facilitates mounting the steering wheel on the steering shaft.

However, the bolt, which is loosely screwed in the bolt hole of the yoke, may fall off during transportation of the steering wheel. In such cases, the bolt must be again loosely screwed in the bolt hole before mounting the steering wheel on the steering shaft. Alternatively, the bolt needs to be positioned with respect to the bolt hole of the yoke after the steering wheel is mounted on the steering shaft in the vehicle.

SUMMARY OF THE INVENTION

Accordingly, it is an object of the present invention to provide a steering wheel that is easily mounted on a steering shaft.

To achieve the above object, the present invention discloses a steering wheel for mounting on a splined steering shaft. The steering wheel comprises a ring member serving as a hand grip, a boss member for surrounding the steering shaft, and at least one spoke member connecting the boss member with the ring member. A securing member is connected to the boss member. The steering shaft is fitted into the securing member for securing the boss member to the steering shaft. The securing member includes a yoke for holding the steering shaft. The yoke has flexible ends constituting a pair of clamping pieces for clamping the steering shaft. At least one of the clamping pieces is provided with a threaded hole. A threaded fastener threads into the threaded hole for tightening the yoke about the steering shaft. A lower cover surrounds the steering shaft for covering a lower part of the steering wheel. The cover includes an integrally formed holder for engaging the threaded fastener and holding the threaded fastener in a ready position prior to when it is fastened to tighten the yoke about the steering shaft.

BRIEF DESCRIPTION OF THE DRAWINGS

The features of the present invention that are believed to be novel are set forth with particularly in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A first embodiment of a steering wheel according to the present invention will hereafter be described with reference to FIGS. 1–11.

Figure 3:
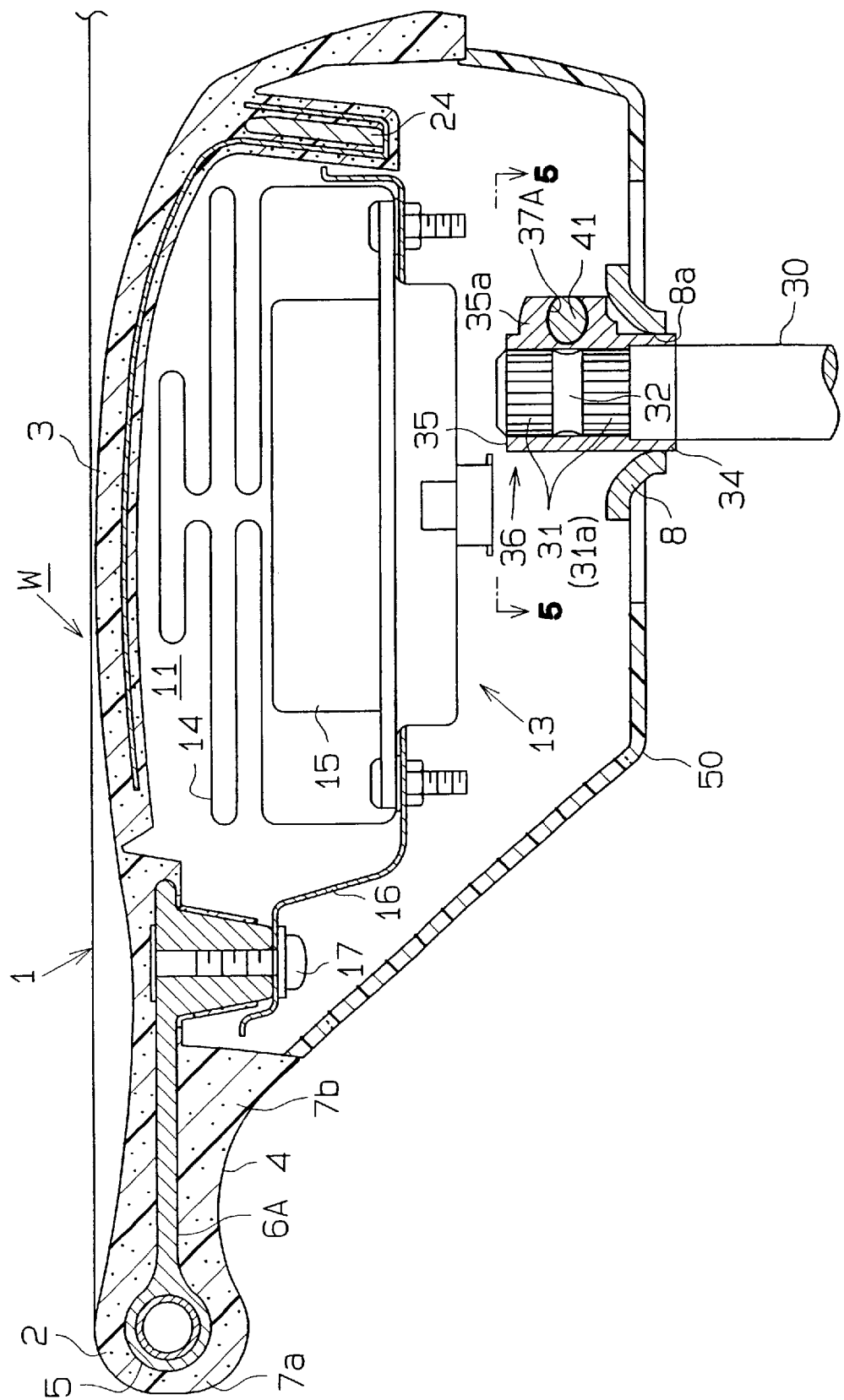
FIG. 3 is an enlarged cross-sectional view of the steering wheel taken along line 3—3 in FIG. 4.
Figure 4:
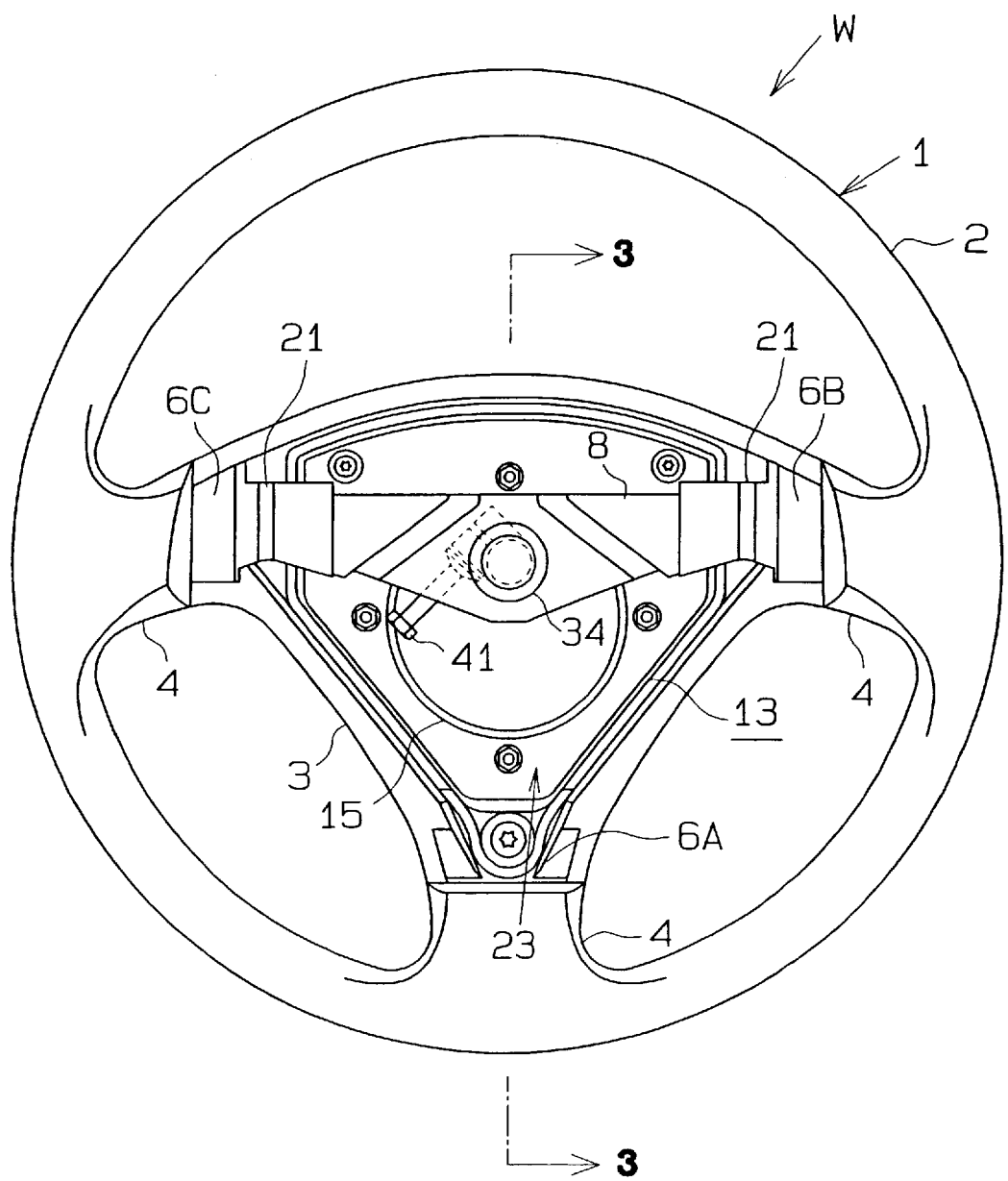
FIG. 4 is a plan view, with parts cut away, showing the rear side of the steering wheel.

As shown in FIGS. 3 and 4, a body 1 of a steering wheel W includes an annular gripping ring 2, a pad 3 arranged in the center of the ring 2, and three spokes 4 extending from the ring 2.

The ring 2 includes a metal ring core 5, which is made of a steel pipe or the like, and a surface layer 7a, which covers a ring core 5. The spokes 4 include metal spoke cores 6A, 6B, 6C, which are die cast from a light metal, such as an aluminum alloy, and a surface layer 7b, which covers the spoke cores 6A, 6B, 6C. The surface layers 7a, 7b and the pad 3 are formed integrally from a soft synthetic resin such as polyurethane foam.

An accommodating recess 11 is defined below the pad 3. The recess 11 is encompassed by the surface layer 7b. A membrane switch (not shown) and an air bag device 13 are accommodated in the recess 11. The membrane switch includes an upper thin plate and a lower thin plate, which constitute a part of a horn switch circuit. When the pad 3 is pressed down, the upper thin plate contacts the lower thin plate to activate the horn.

The air bag device 13 includes an air bag 14 and an inflator 15, which provides gas to inflate the air bag 14. The air bag 14 is retained in a folded state. The air bag device 13 is provided with a bag holder 16 for securing the air bag device 13 in the recess 11. As shown in FIG. 3, the bag holder 16 may be secured to the spoke core 6A and other members by bolts 17.

Figure 6:
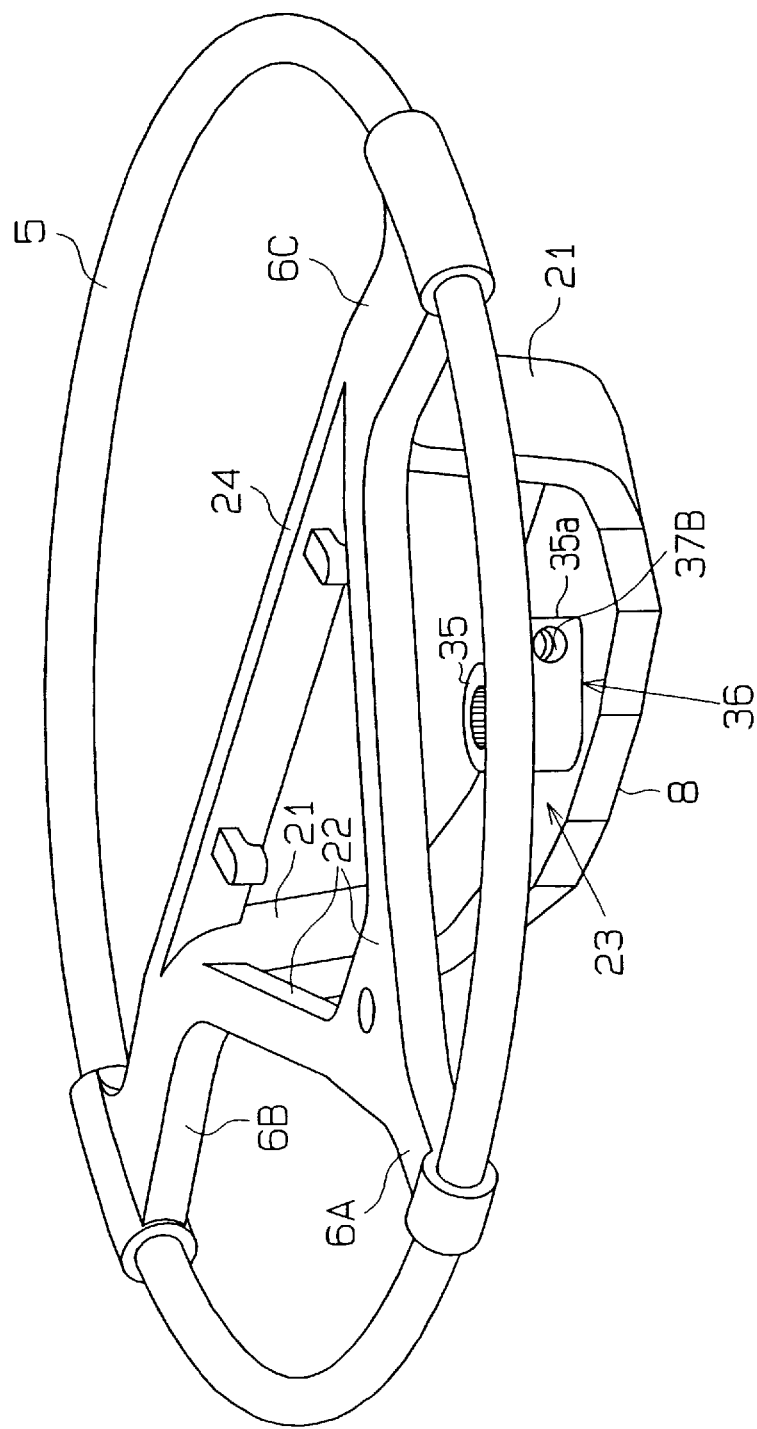
FIG. 6 is a perspective view showing the metal core structure of the steering wheel.

A steel boss plate 8 is formed integrally with the body 1 of the steering wheel W. Specifically, as shown in FIG. 6, the boss plate 8 is connected to the spoke cores 6B, 6C by a pair of arms 21. The boss plate 8 is arranged at a position lower than the ring core 5 and the spoke cores 6B, 6C.

The spoke cores 6B, 6C are connected to the spoke core 6A by connecting bars 22. This structure firmly secures the spoke cores 6A–6C, the ring core 5, and the boss plate 8 to each other. A relatively large space 23 is defined between the boss plate 8, the arms 20, and the connecting bars 22. The space 23 opens toward the driver seat of a vehicle. As shown in FIGS. 3 and 6, a support bar 24 connects the spoke cores 6B, 6C to each other to ensure safety during inflation of the air bag 14. The connecting bars 21, 22 and the support bar 24 are die cast from aluminum, like the spoke cores 6A–6C.

As shown in FIG. 3, a resin lower cover 50 is arranged below the body 1 of the steering wheel W to encompass a steering shaft 30.

Figure 5:
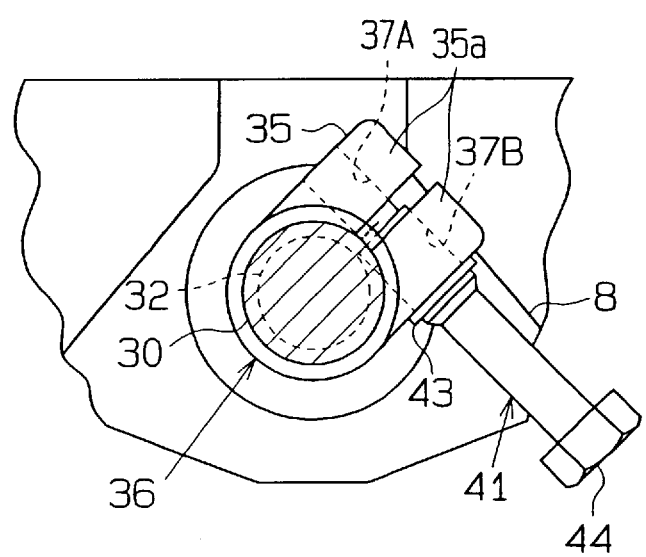
FIG. 5 is an enlarged partial cross-sectional view of the steering wheel taken along line 5—5 in FIG. 3.
Figure 10:
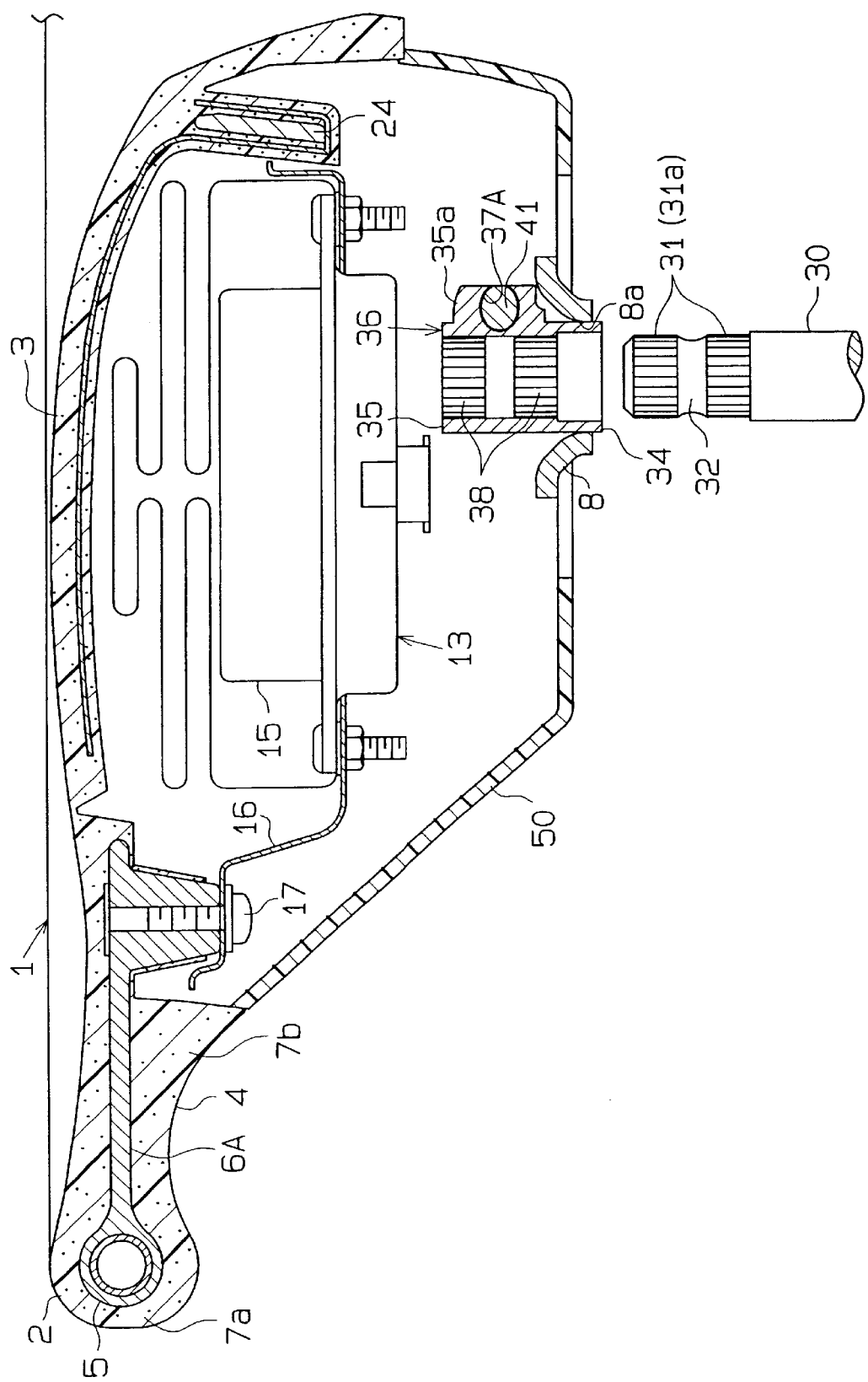
FIG. 10 is a cross-sectional view showing the steering wheel mounted on the steering shaft.

As shown in FIG. 10, axial teeth, or splines 31, are formed on the distal end of the steering shaft 30. An annular groove 32 is defined between two sets of splines 31 on the steering shaft 30. The splines 31 include a predetermined number of axial grooves 31a (generally about thirty). As shown in FIGS. 5 and 10, a through hole 8a is defined in the center of the boss plate 8. A steel adaptor 36 is inserted in the through hole 8a and welded to the boss plate 8.

A cylindrical portion 34 forms a lower part of the adaptor 36 while a yoke 35 forms an upper part thereof. The cylindrical portion 34 is inserted in the through hole 8a. As shown in FIG. 5, the yoke 35 is arched and includes a pair of clamping pieces 35a. The clamping pieces 35a, which extend substantially parallel to each other, are arranged at each end of the yoke 35. One of the clamping pieces 35a is provided with a bolt hole 37A, and the other is provided with through hole 37B. The inner diameter of the bolt hole 37A is smaller than that of the through hole 37B.

Splines 38 corresponding to the splines 31 of the steering shaft 30 are formed on the inner surface of the adaptor 36. The adaptor 36 is mounted on the steering shaft 30 by meshing the splines 31 of the steering shaft 30 and the splines 38 of the adaptor 36. A bolt 41 is then inserted through the hole 37B and then screwed into the hole 37A. A threaded portion 42 is arranged at a distal end of the bolt 41, while a flange 43 is arranged at an intermediate portion of the bolt 41. The bolt 41 also includes a head 44, which is arranged at its proximal end. Screwing the threaded portion 42 in the bolt hole 37A causes the flange 43 to abut against one of the clamping pieces 35a. In this manner, the distal end of the steering shaft 30 is held with the yoke 35 of the adaptor 36. Therefore, the adaptor 36 secures the boss plate 8 to the steering shaft 30.

The characteristics of the first embodiment will now be described.

As shown in FIGS. 1, 2, 7 and 8, a bolt holder 51 is formed integrally with the lower cover 50. The bolt holder 51 includes a support member 52 and an engaging member 53. A proximal portion of the support member 52 is connected integrally to the lower cover 50 by a thin hinge portion 55. A gripping portion 54 is arranged at a distal portion of the support member 52 for gripping the bolt 41. The bolt 41 is gripped by the gripping portion 54 at a position between the flange 43 and the head 44.

Figure 7:
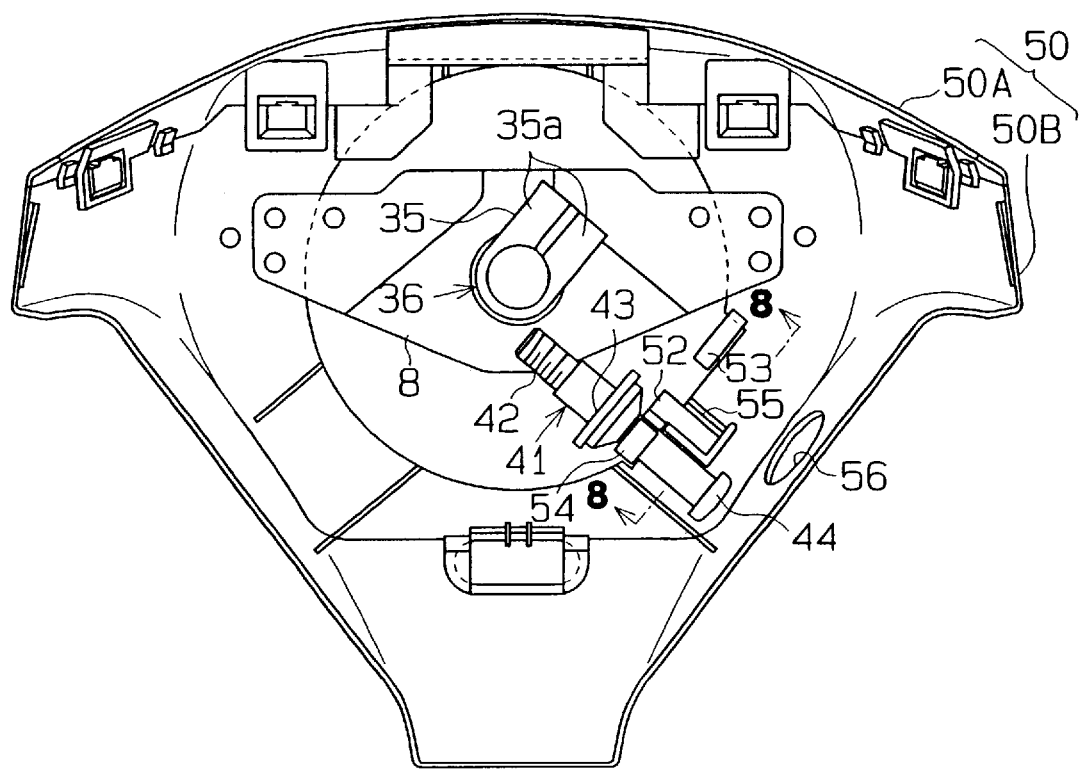
FIG. 7 is a plan view showing the lower cover structure of the steering wheel before bending the bolt holder.
Figure 8:
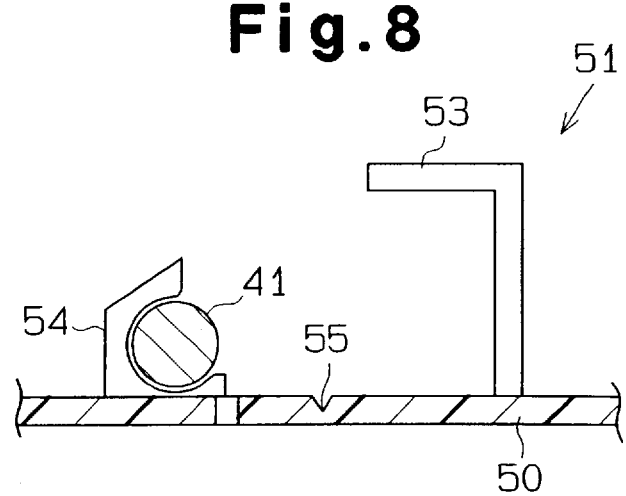
FIG. 8 is an enlarged partial cross-sectional view of the steering wheel taken along line 8—8 in FIG. 7.

As shown in FIGS. 7 and 8, the lower cover 50 is molded with the support member 52 of the bolt holder 51 arranged substantially on the same plane as a base plate of the lower cover 50. When molding the lower cover 50, if the support member 52 were to extend from the base plate of the lower cover 50 as it does in FIG. 2, removing the lower cover 50 from the mold would be extremely difficult. However, arranging the support member 52 substantially on the same plane as the base plate of the lower cover 50 as in FIG. 8 facilitates removing the product from the mold.

Figure 1:
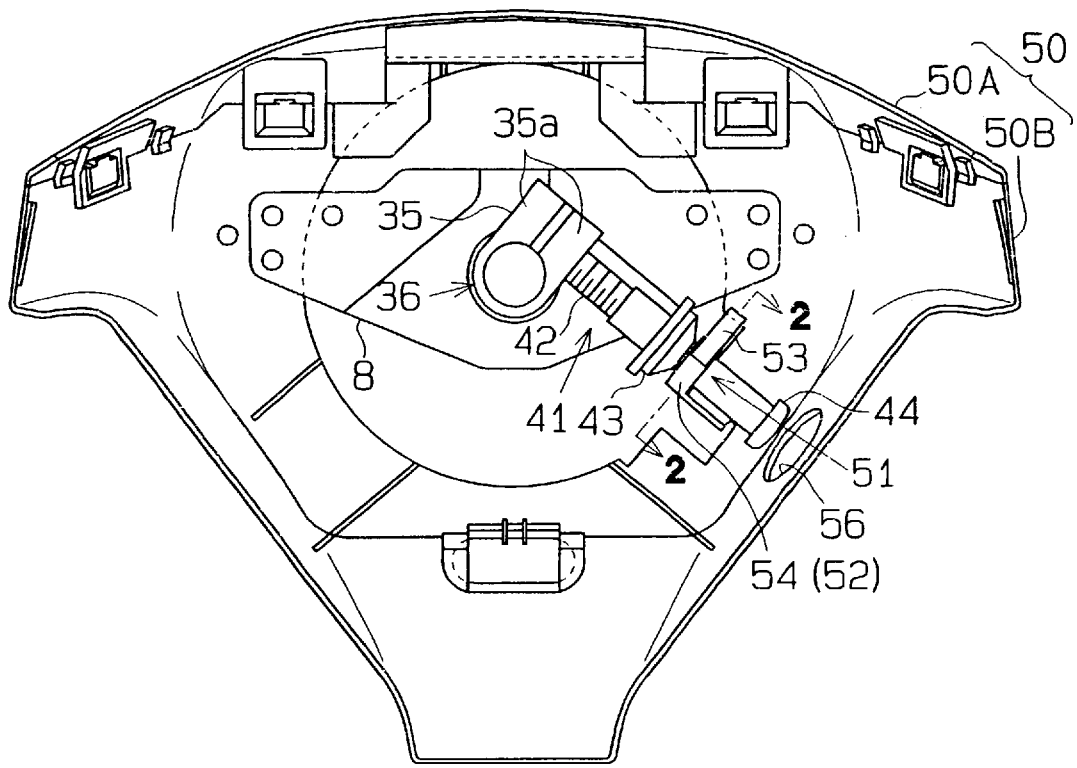
FIG. 1 is a plan view showing the lower cover structure of a steering wheel of a first embodiment according to the present invention.
Figure 2:
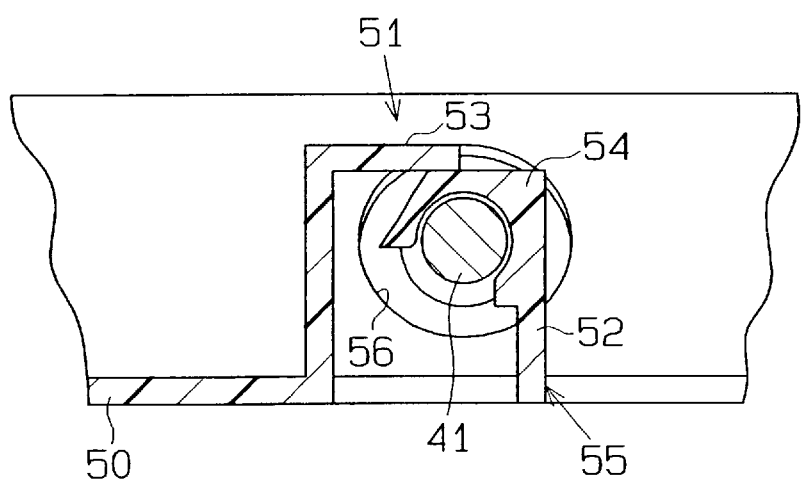
FIG. 2 is an enlarged partial cross-sectional view of the steering wheel taken along line 2—2 in FIG. 1.

Before loosely screwing the bolt 41 into the bolt hole 37A of the clamping piece 35a of the yoke 35, the bolt 41 is gripped by the gripping portion 54 as shown in FIGS. 1 and 2. Then, the support member 52 is bent upward about the hinge portion 55 so that the support member 52 extends substantially perpendicular to the base plate of the lower cover 50. This causes the distal end of the support member 52 to abut against the engaging member 53. Therefore, the support member 52 is held in a state where it is perpendicular to the base plate of the lower cover 50. Subsequently, the bolt 41 is inserted into through the hole 37B and then loosely screwed in the bolt hole 37A. The support member 52 continuously abuts against the engaging member 53 to hold the bolt 41 before it is firmly screwed in the hole 37A.

The flange 43 and the head 44 of the bolt 41 serve as a stopping mechanism. Specifically, the flange 43 or the head 44 abuts against the gripping portion 54, which holds the bolt 41. In this manner, the bolt 41 is prevented from falling out of the bolt holder 51 in the axial direction of the bolt 41.

Figure 11:
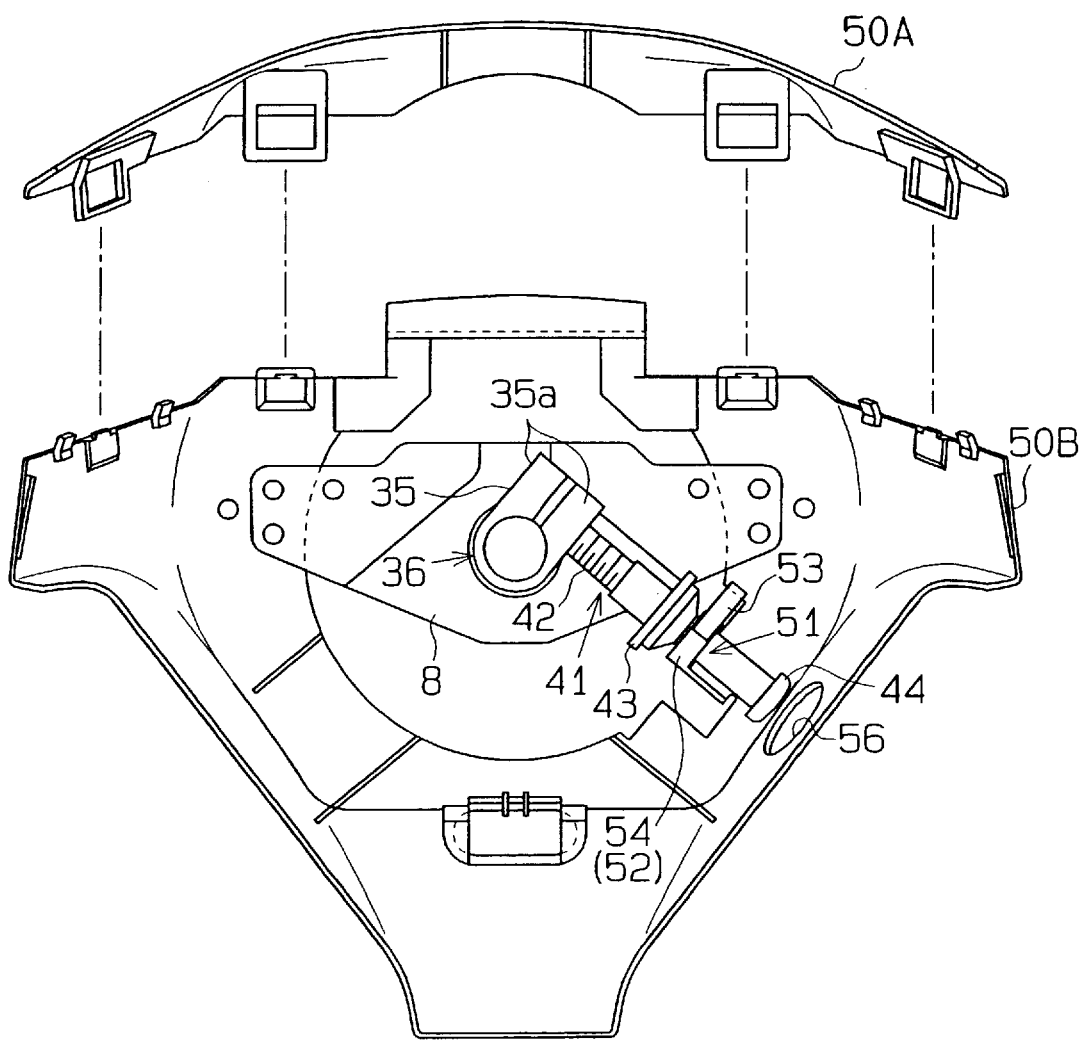
FIG. 11 is a plan view showing the detached lower cover.

The lower cover 50 includes a first portion 50A and a second portion 50B, which may be detached from each other. As shown in FIG. 11, the second portion 50B is detached from the first portion 50A to facilitate installation of things such as the membrane switch and the air bag device 13. Furthermore, a through hole 56 is provided at a side of the lower cover 50 to provide access the bolt 41 with a tool.

The procedures to mount the steering wheel W on the steering shaft 30 will now be described.

Figure 9:
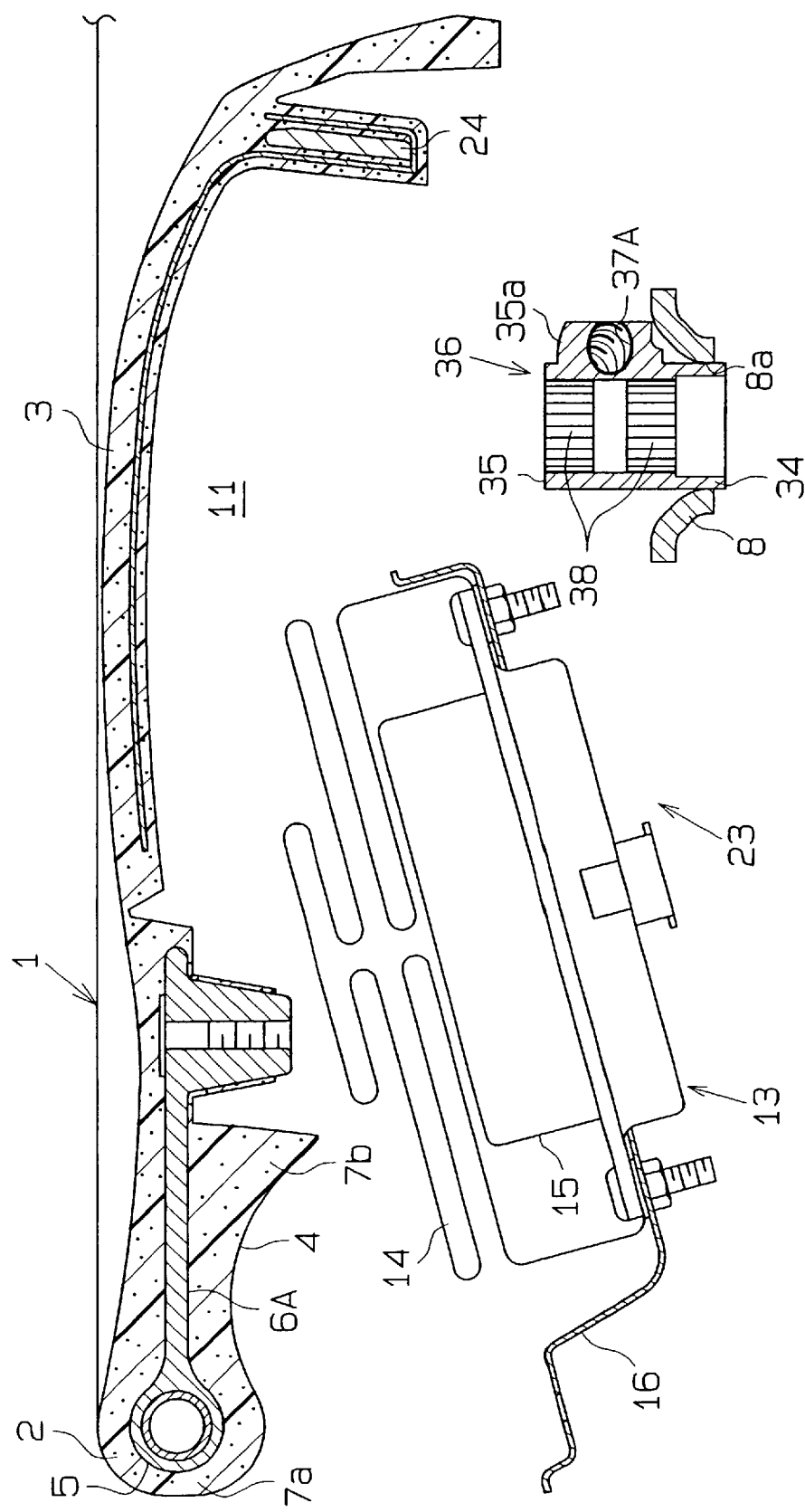
FIG. 9 is a cross-sectional view showing the steering wheel before installing an air bag device.

As shown in FIG. 9, the membrane switch and the air bag device 13 are inserted into the space 23 defined by the boss plate 8, the arms 21, and the connecting bars 22. The bag holder 16, which is mounted on the air bag device 13, is secured to the spoke core 6A and other members by the bolts 17. Since the space 23 is relatively large, the air bag device 13 is easily installed in the wheel body 1.

Before mounting the lower cover 50 on the body 1, the bolt 41 is fitted into the bolt holder 51, which is in its unfolded position. As shown in FIGS. 7 and 8, when the lower cover 50 is formed, the support member 52 of the bolt holder 51 is arranged substantially on the same plane as the base plate of the lower cover 50. In this state, the bolt 41 is gripped by the gripping portion 54 of the support member 52. Then, as shown in FIG. 2, the support member 52 is bent upward about the hinge portion 55 so that the support member 52 extends substantially perpendicular to the base plate of the lower cover 50. This causes the distal end of the support member 52 to abut against the engaging member 53. In this manner, the support member 52 is maintained in a state where it is bent upward with respect to the base plate of the lower cover 50. Subsequently, the lower cover 50 is mounted on the body 1. Then, as shown in FIG. 1, the bolt 41, which is gripped by the gripping portion 54, is arranged along the same axis as the bolt hole 37A and the through hole 37B of the clamping pieces 35a of the yoke 35. The bolt 41 is then inserted through the through hole 37B and then loosely screwed into the bolt hole 37A. Furthermore, the support member 52 holding the bolt 41 may be bent upward after mounting the lower cover 50 on the body 1.

Subsequently, as shown in FIGS. 10 and 3, the steering wheel W is mounted on the distal end of the steering shaft 30 by means of the adaptor 36. This meshes the splines 31 of the steering shaft 30 and the splines 38 of the adaptor 36. Then, a prescribed tool (not shown) is inserted from a side of the steering wheel W into the through hole 56 of the lower cover 50. The tool is then engaged with the head 44 of the bolt 41 to fasten the bolt 41. As shown in FIG. 5, the flange 43 of the bolt 41 then abuts against one of the clamping pieces 35a. In this manner, the steering shaft 30 is held by the yoke 35. This firmly meshes the splines 31 of the steering shaft 30 and the splines 38 of the adaptor 36. Then, a portion of the bolt 41 engages with the annular groove 32 on the steering shaft 30. The meshing between the splines 31, 38 prevents relative rotation of the steering wheel W with respect to the steering shaft 30. The engagement between the bolt 41 and the annular groove 32 prevents movement of the steering wheel W in the axial direction of the steering shaft 30. As a result, the adaptor 36 secures the steering wheel W to the steering shaft 30.

Effects and advantages of the first embodiment will now be described.

As described above, this embodiment employs the boss plate 8 including the yoke 35. This structure allows screwing the bolt 41 from the side of the steering wheel W. Therefore, even with the pad 3 and the surface layer 7a, 7b formed integrally, the steering wheel W is easily mounted on the steering shaft 30.

Before mounting the steering wheel W on the steering shaft 30, the bolt 41 is loosely screwed in the bolt hole 37A of the yoke 35. Therefore, the bolt 41 need not be positioned with respect to the through hole 37B and the bolt hole 37A in the limited space allowed for assembly. Accordingly, the bolt 41 is simply fastened by the prescribed tool to secure the steering wheel W to the steering shaft 30. This structure further facilitates mounting the steering wheel W on the steering shaft 30.

The lower cover 50 is provided with the bolt holder 51. The bolt holder 51 holds the bolt 41 which is loosely screwed in the bolt hole 37A of the yoke 35 to prevent the bolt 41 from falling off the yoke 35. Therefore, the bolt 41 is securely supported in the yoke 35.

The lower cover 50 is molded with the support member 52 of the bolt holder 51 arranged substantially on the same plane as the base plate of the lower cover 50. This makes it easier to remove the product from the mold. Before loosely screwing the bolt 41 in the bolt hole 37A, the support member 52 holding the bolt 41 is bent upward about the hinge portion 55 so that the support member 52 extends substantially vertical to the base plate of the lower cover 50. This causes the support member 52 to abut against the engaging member 53. In this manner, the support member 52 is maintained in a state where it is perpendicular with respect to the base plate. As a result, the support member 52 securely holds the bolt 41 which is loosely screwed in the bolt hole 37A.

With the support member 52 abutting against the engaging member 53, the bolt 41 gripped by the gripping portion 54 is arranged on the same axis as the bolt hole 37A and the through hole 37B of the yoke 35. Therefore, the bolt 41 may be easily positioned with respect to the bolt hole 37A and the through hole 37B to facilitate screwing the bolt 41 loosely in the holes 37A, 37B.

The flange 43 or the head 44 of the bolt 41 engages with the gripping portion 54 gripping the bolt 41. This prevents the bolt 41 from falling out of the bolt holder 51 in the axial direction of the bolt 41. In this manner, the bolt 41, which is loosely screwed in the bolt hole 37A, is securely held by the holder 51.

A second embodiment according to the present invention will now be described with reference to FIGS. 12 and 13. Parts differing from the first embodiment will mainly be described. Furthermore, to avoid a redundant description, like or same reference numerals are given to those components that are like or the same as the corresponding components of the first embodiment.

Figure 12:
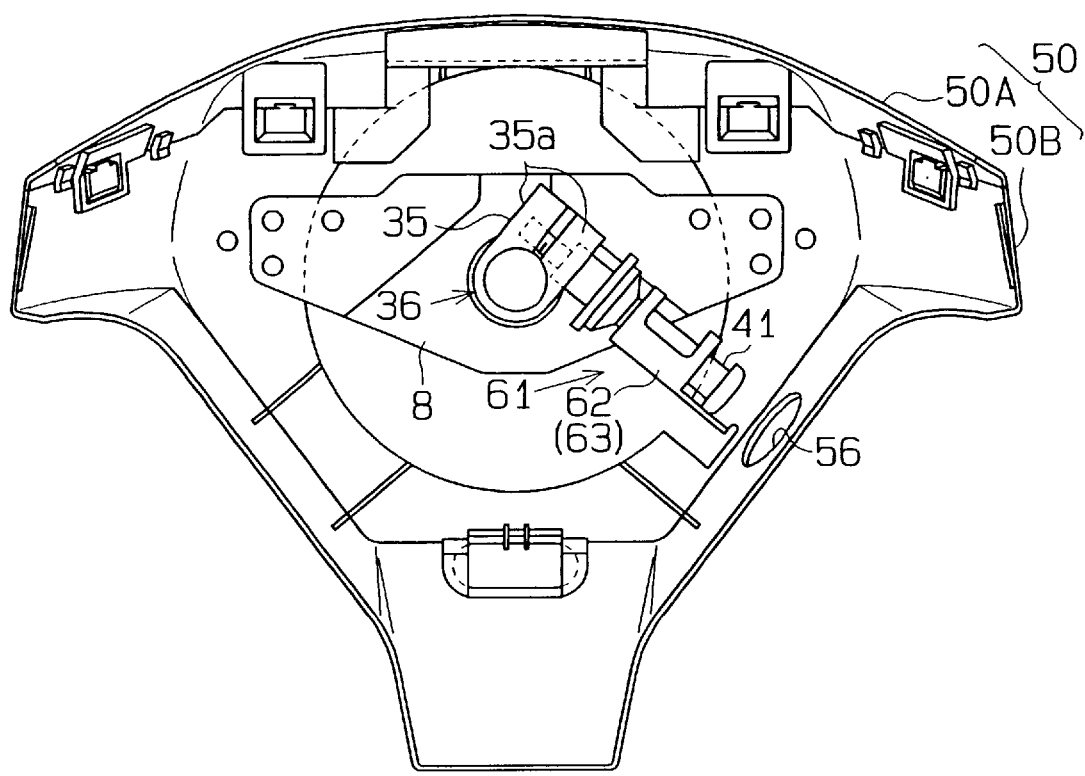
FIG. 12 is a plan view showing the lower cover structure of the steering wheel of a second embodiment according to the present invention.
Figure 13:
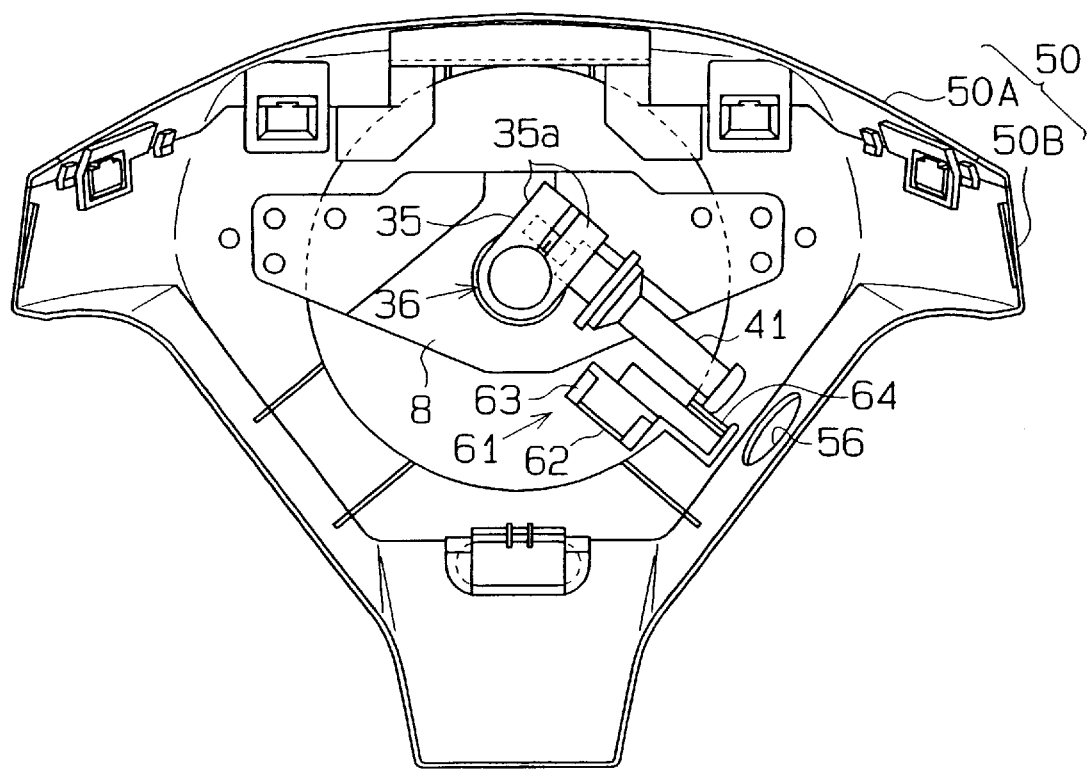
FIG. 13 is a plan view showing the lower cover structure of the steering wheel before bending the bolt holder.

As shown in FIGS. 12 and 13, according to the second embodiment, a bolt holder 61 has a structure different from the first embodiment. Specifically, the bolt holder 61 is constituted by a support member 62. The bolt holder 61 does not have a component corresponding to the engaging member 53 of the first embodiment. As in the first embodiment, a proximal end of the support member 62 is connected integrally to the lower cover 50 by a thin hinge portion 64. Furthermore, a gripping portion 63 is provided at a distal portion of the support member 62 for gripping the bolt 41.

As shown in FIG. 13, the lower cover 50 is molded with the support member 62 arranged substantially on the same plane as the base plate of the lower cover 50. As in the first embodiment, this structure facilitate molding the lower cover 50.

According to the second embodiment, as shown in FIG. 13, the bolt 41 is inserted through the through hole 37B of the yoke 35 and is then loosely screwed into the bolt hole 37A before bending the support member 62. Furthermore, the lower cover 50 is mounted on the body 1 of the steering wheel W immediately before or after the bolt 41 is loosely screwed in the hole 37A. Subsequently, as shown in FIG. 12, the support member 62 is bent upward about the hinge 64 so that the support member 62 extends substantially perpendicular to the base plate of the lower cover 50. Then, the bolt 41, which is loosely screwed in the hole 37A, is gripped by the gripping portion 63 of the support member 62. Thus, the support member 62 is maintained in a state where it is bent upward with respect to the base plate of the lower cover 50 by gripping the bolt 41 with the gripping portion 63.

Thus, with the bolt holder 61 constituted by the support member 62, the support member 62 is securely supported in a state where it is bent upward with respect to the lower cover 50. Therefore, the second embodiment simplifies the mold structure used for molding the lower cover 50 including the bolt holder 61 in comparison with the first embodiment. The other operations and the effects are the same in the first embodiment.

Although only two embodiments of the present invention have been described herein, it should be apparent to those skilled in the art that the present invention may be embodied in many other specific forms without departing from the spirit or scope of the invention. Particularly, it should be understood that the present invention may also be modified as described below.

In the first and the second embodiments, the lower cover 50 may be molded with the support portion 52, 62 extending in one of many directions from the base plate of the lower cover 50, as long as the lower cover 50 is removable from the mold.

In the first and the second embodiments, the steering wheel W includes three spokes 4. However, the present invention may be embodied in steering wheels having two spokes or four or more spokes.

In the first embodiment, the bolts 17 secure the air bag device 13 to the body 1 of the steering wheel W. However, other fasteners such as rivets or clips may be employed.

The shape of the bolt 41 is not restricted to that of the first and the second embodiment. Bolts with a normal shape may be used.

Therefore, the present examples and embodiments are to be considered as illustrative and not restrictive and the invention is not to be limited to the details given herein, but may be modified within the scope of the appended claims.

What is claimed is:

1. A steering wheel for mounting on a splined steering shaft, the steering wheel comprising:

a ring member serving as a hand grip;

a boss member for surrounding the steering shaft;

at least one spoke member connecting the boss member with the ring member;

a securing member connected to the boss member, wherein the steering shaft is fitted into the securing member for securing the boss member to the steering shaft, the securing member including a yoke for holding the steering shaft, the yoke having flexible ends constituting a pair of clamping pieces for clamping the steering shaft, at least one of the clamping pieces being provided with a threaded hole;

a threaded fastener for threading into the threaded hole for tightening the yoke about the steering shaft;

a lower cover surrounding the steering shaft for covering a lower part of the steering wheel, wherein the cover includes an integrally formed holder for engaging the threaded fastener and holding the threaded fastener in a ready position prior to when it is fastened to tighten the yoke about the steering shaft.

2. The steering wheel according to claim 1, wherein the one of the clamping pieces is provided with the threaded hole while the other clamping piece is provided with a through hole, and the threaded fastener is inserted through the through hole and is then screwed into the threaded hole.

3. The steering wheel according to claim 1, wherein the lower cover is made from synthetic resin.

4. The steering wheel according to claim 3, wherein the lower cover includes a planar base and is molded, and wherein the holder includes a gripping member for gripping the threaded body, the gripping member having an arm that is arranged substantially on the same plane as the planar base when molding the lower cover, wherein the gripping member is bent to an upright position with respect to the lower cover for positioning the threaded fastener in the ready position.

5. The steering wheel according to claim 4, wherein the holder includes an engaging member which engages with the gripping member when the gripping member is bent to the upright position.

6. The steering wheel according to claim 1, wherein the threaded fastener includes a stopping structure for engaging the holder to prevent the threaded fastener from sliding axially out of the holder.

7. The steering wheel according to claim 6, wherein the stopping structure includes a first and a second engaging portion, each arranged on the threaded fastener, the threaded fastener being held by the holder at a position between the first engaging portion and the second engaging portion.

8. The steering wheel according to claim 1, wherein the steering shaft and the securing member are splined, the splines of the steering shaft and the securing member meshing with each other for preventing rotation of the boss member with respect to the steering shaft.

9. The steering wheel according to claim 1, wherein the steering shaft includes an annular groove, the annular groove being arranged to receive the threaded fastener for preventing movement of the boss member in the axial direction of the steering shaft when the threaded fastener is screwed into the threaded hole.

10. The steering wheel according to claim 1, wherein the securing member includes a cylindrical portion into which the steering shaft is inserted, and wherein the yoke is formed integrally with the cylindrical portion.

11. A steering wheel for mounting on a splined steering shaft, the steering wheel comprising:

a ring member serving as a hand grip;

a boss member for surrounding the steering shaft;

at least one spoke member connecting the boss member with the ring member;

a securing member connected to the boss member, wherein the steering shaft is fitted into the securing member for securing the boss member to the steering shaft, the securing member including a yoke for holding the steering shaft, the yoke having flexible ends constituting a pair of clamping pieces for clamping the steering shaft, at least one of the clamping pieces being provided with a threaded hole;

a threaded fastener for threading into the threaded hole for tightening the yoke about the steering shaft, the threaded fastener having a longitudinal axis about which it is rotated to tighten the clamping pieces;

a lower cover surrounding the steering shaft for covering a lower part of the steering wheel, wherein the cover includes an integrally formed holder for engaging the threaded fastener and holding the threaded fastener in a ready position prior to when it is fastened to tighten the yoke about the steering shaft, wherein the axis of the threaded fastener is transverse to the axis of the steering shaft when the threaded fastener is in the ready position.

12. The steering wheel according to claim 11, wherein a hole is formed in the lower cover to provide access to the threaded fastener from the side of the steering wheel.

13. The steering wheel according to claim 11, wherein the holder is molded into the lower cover, and wherein a flexible hinge is molded into a proximal end of the holder such that the holder is movable with respect to the lower cover about the hinge.

* * * * *